United States Patent [19]

Nakagawa

[11] 4,298,660
[45] Nov. 3, 1981

[54] STEEL FIBER FOR REINFORCED CONCRETE

[75] Inventor: Takeo Nakagawa, Kawasaki, Japan

[73] Assignee: Keinosuke Aida, Sagamihara, Japan

[21] Appl. No.: 967,389

[22] Filed: Dec. 7, 1978

Related U.S. Application Data

[62] Division of Ser. No. 800,031, May 24, 1977, abandoned.

[30] Foreign Application Priority Data

May 24, 1976 [JP] Japan .................. 51-59190

[51] Int. Cl.³ .............................. B32B 15/02
[52] U.S. Cl. ............................ 428/599; 428/600; 106/99
[58] Field of Search .................. 428/599-601, 428/605; 75/251, 0.5 B, 0.5 BA; 148/31; 106/99; 140/139, 140, 149; 29/4.5 R; 82/1 R, 1C, 47; 90/11 C; 144/326 A-326 C, 172; 407/30, 31, 56, 58, 59, 61, 62, 63

[56] References Cited

U.S. PATENT DOCUMENTS

| | | | |
|---|---|---|---|
| 1,432,580 | 10/1922 | Vauclain et al. .................. | 407/31 |
| 2,230,662 | 2/1941 | Whitman .................. | 407/58 |
| 2,411,784 | 11/1946 | Goldsmith .................. | 407/31 |
| 2,431,294 | 11/1947 | Dulmage .................. | 29/4.5 |
| 2,751,947 | 6/1956 | Wyss .................. | 144/326 C |
| 2,969,816 | 1/1961 | Johnsa .................. | 144/172 |
| 3,070,871 | 1/1963 | Ryckebosch .................. | 428/605 |
| 3,082,802 | 3/1963 | Dickson et al. .................. | 144/326 B |
| 3,319,673 | 5/1967 | Voelskow .................. | 144/172 |
| 3,346,028 | 10/1967 | Mitten .................. | 144/172 |
| 3,429,094 | 2/1969 | Romualdi .................. | 106/99 |
| 3,724,046 | 4/1973 | Mayuzumi et al. .................. | 407/31 |
| 3,725,999 | 4/1973 | Birkenmaier et al. .................. | 140/149 |
| 3,834,878 | 9/1974 | Vansteenkiste .................. | 428/611 |
| 3,977,447 | 8/1976 | Pease .................. | 144/172 |
| 3,986,885 | 10/1976 | Lankard .................. | 106/99 |
| 4,050,949 | 9/1977 | Lundgren et al. .................. | 75/251 |
| 4,121,943 | 10/1978 | Akazawa et al. .................. | 106/99 |

FOREIGN PATENT DOCUMENTS 1941223  2/1971  Fed. Rep. of Germany ........ 106/99
52-16122  5/1977  Japan .................. 106/99

OTHER PUBLICATIONS

Arshinov, V. A., et al.; "Machining of Metals and Cutting Tools," *Engineering*, Moscow pp. 293, 305-306 (1964).

Malov, A. N.; "Brief Metallurgist Manual", *Engineering* Moscow, pp. 722, 723, 728 (1965).

*Primary Examiner*—Michael L. Lewis
*Attorney, Agent, or Firm*—Armstrong, Nikaido, Marmelstein & Kubovcik

[57] ABSTRACT

This invention is concerned with the production of steel fiber by machining a thick steel plate or block for reinforced concrete, where a milling cutter having a plurality of cutting edges is positioned on the steel plate or block and is moved relatively in the horizontal direction. A surface of said plate or block is machined by the rotating cutting edges to chop steel fibers of approximate triangular in cross section. According to this method, steel fibers of high quality may be economically produced.

6 Claims, 18 Drawing Figures

FIG_1
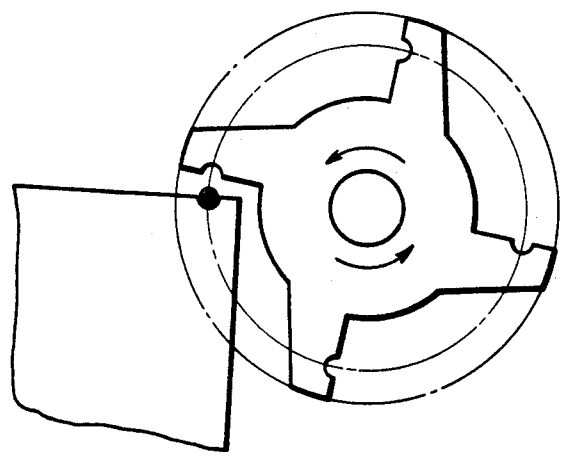
FIG_2
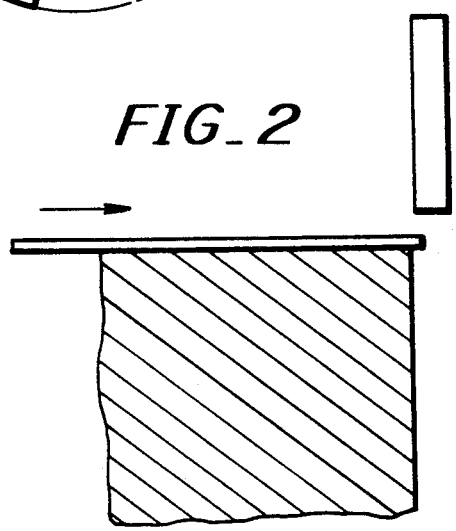
FIG_3
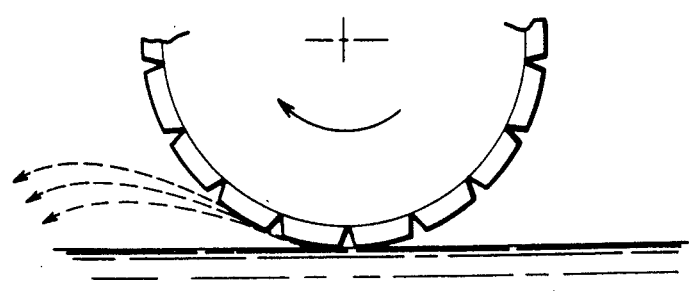

FIG_4
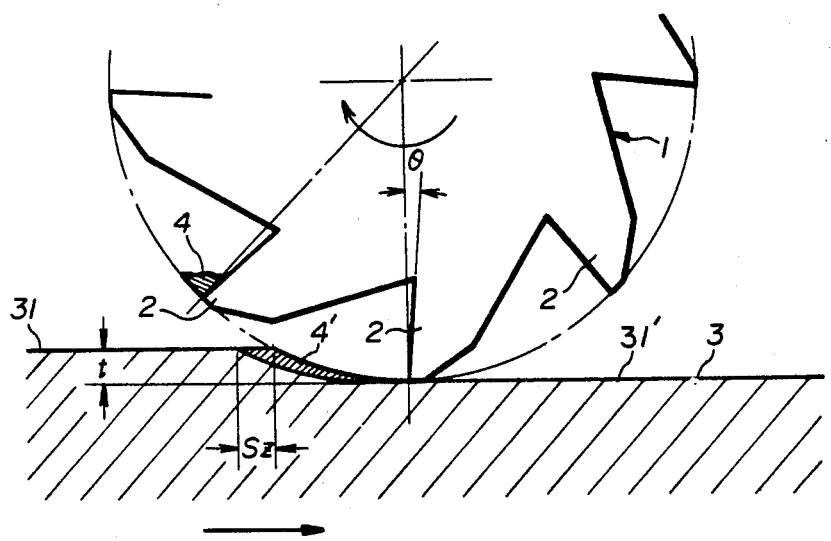
FIG_5
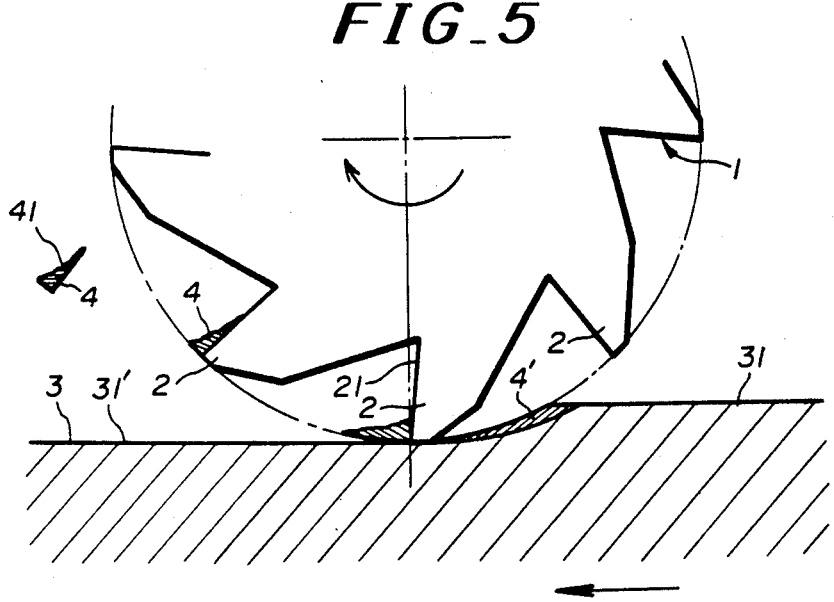

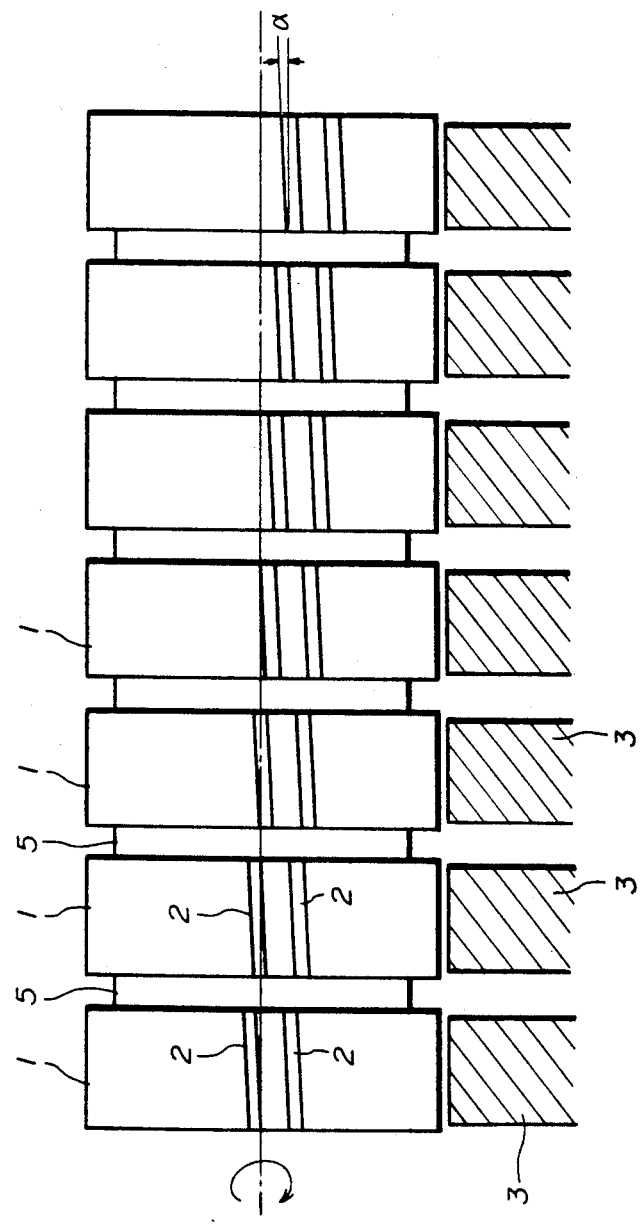

FIG_7
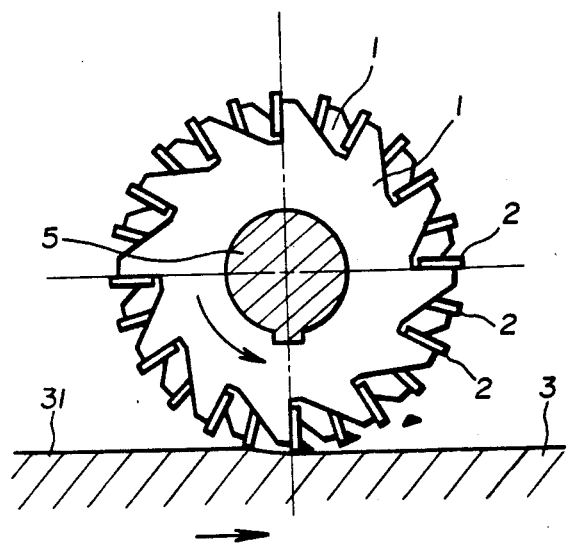
FIG_8
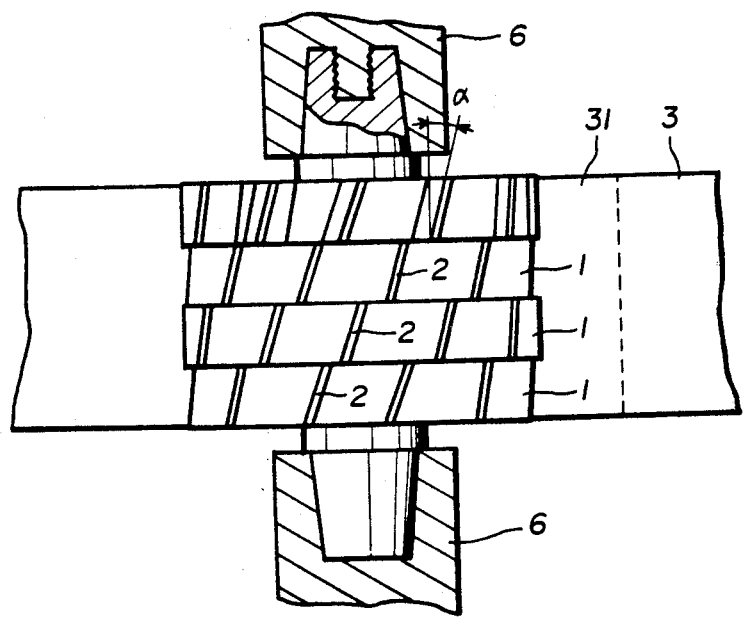

FIG_9
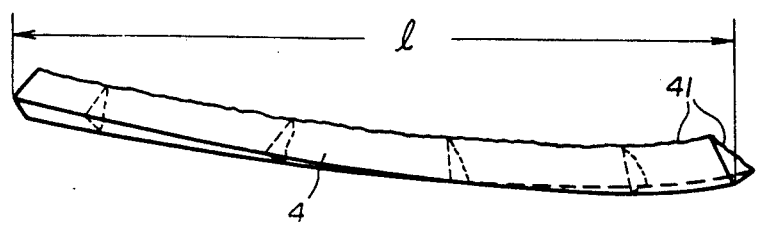
FIG_10
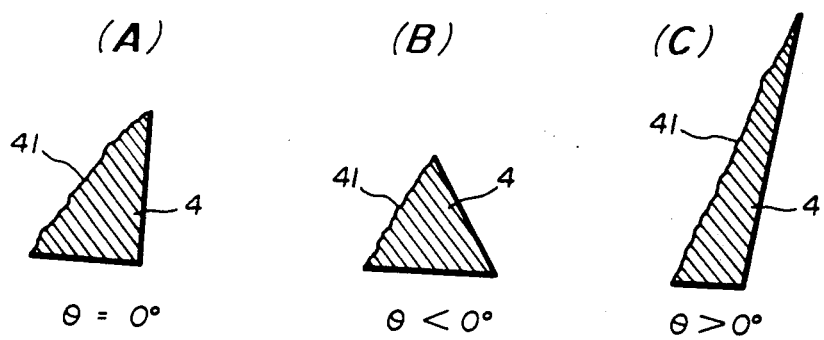
(A) θ = 0°   (B) θ < 0°   (C) θ > 0°
FIG_11    FIG_12    FIG_13
(A)     (A)     (A)
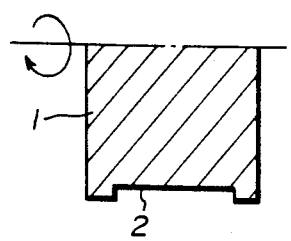 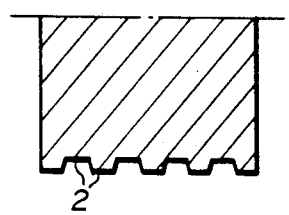 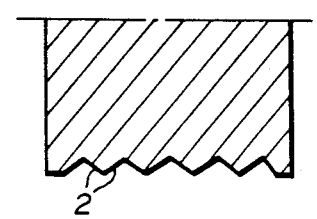
(B)     (B)     (B)
  

FIG_15
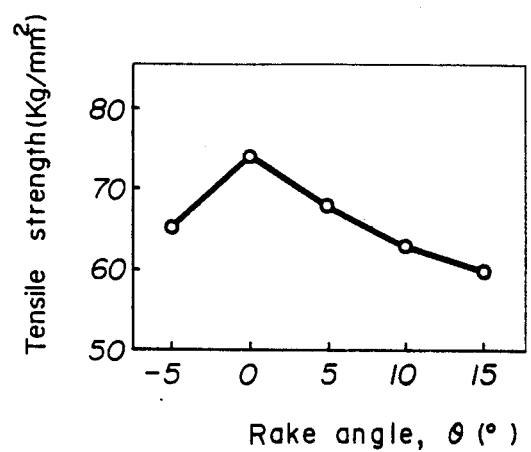
FIG_16
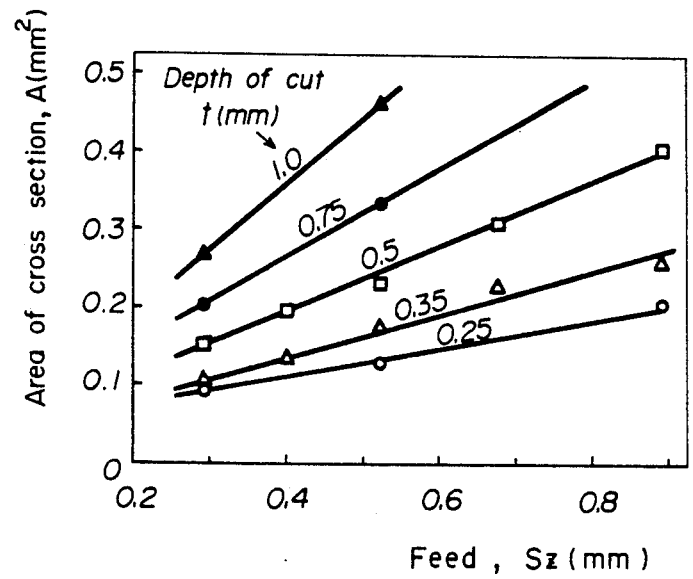

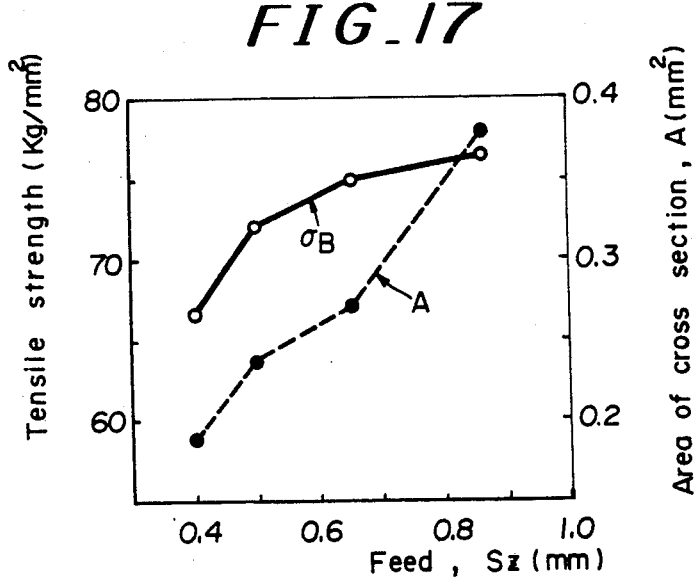
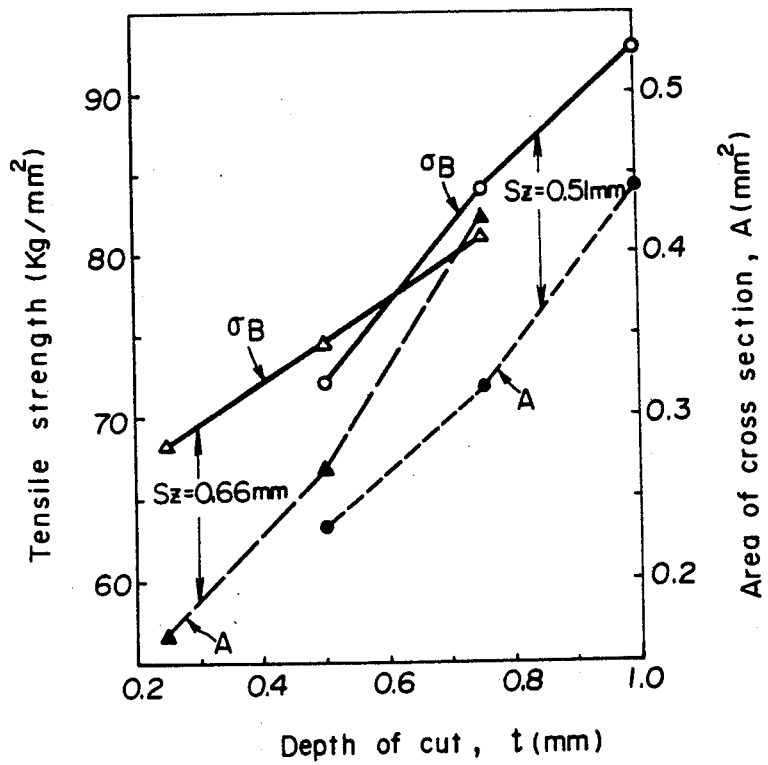

STEEL FIBER FOR REINFORCED CONCRETE

This is a division of application Ser. No. 800,031, filed May 24, 1977, now abandoned.

BRIEF DESCRIPTION OF THE INVENTION

This invention relates to a production of steel fiber for reinforced concrete by machining a thick steel plate or block.

Recently there have been developed some methods which mix steel fibers as reinforcing materials for the steel fiber reinforced concrete having high strength. The concretes are excellent in various characteristics such as the tensile strength, cracking strength, shearing strength, elongating ability, toughness, dynamic strength, fatigue strength and others, and its wide application is demanded in the secondary product for construction or road pavement. Further, it has been projected nowadays to establish highways, airports, oil storage facilities or electric power stations on the sea bottom or over the sea surface. Since those oceanic structures severely of high earthquake resistability, the steel fiber reinforced concrete is well suited for the structural materials.

Thus, it is preferable that the steel fiber is as hard and strong and it is not broken at mixing into concrete or aggregate. A steel fiber which is too short or too thick in size is insufficient in the reinforcing ability, and a steel fiber which is too long or too thin is apt to make ball shaped concrete lumps. In general, the fiber of 0.1 to 0.4 $mm^2$ in an area of cross section and 20 to 50 mm in length is recommended. However, besides the above mentioned strengthening characteristics or size, the cheap cost is an absolute condition, because it is usually used around 2% in the volume ratio and around 160 $kg/m^2$ in the weight ratio.

The conventional methods of producing the steel fibers for reinforcing the concrete are known as (1) cutting from a wire (see FIG. 1), (2) shearing from thin sheet (see FIG. 2) and (3) extracting from a molten metal (see FIG. 3). Unfortunately, those methods have some drawbacks in the quality or the production cost, and therefore they could not always satisfy the above mentioned requirements. That is, in the method (1) of cutting from a wire, though the fiber is good in strength, it is poor in catching the concrete, because of only cutting the round or needle shaped steel wire, and it is required for crashing its ends or midway in length or bending before or after cutting the wire, and moreover it is difficult to cut many steel wires at the same time with rotating cutting edges and also difficult to speedily feed the wires. Consequently, the producing efficiency is lowered disadvantageously, and the production cost is very high as a whole, since the wire material is expensive.

The method (2) which shears a thin steel sheet by means of a shearing member is better than the molten metal extracting method (3), since the fiber sheared by this method is superior in strength than those according to the latter. However, the productivity is low, in view of requirements of the press-forming and the crashing or bending for catching the concrete as in the method (1), and since the thin steel sheet requires high processing and further the sheet must be slit in width in advance for meeting the length requirements of the desired fibers. This method is also involved with the disadvantage of high production costs similarly to the method (1).

The method (3) extracts the molten steel at high temperature by means of the rotating disk and splashes it off by centrifugal force thereby to instantaneously solidify drops of the molten metal. This process produces the steel fibers directly from the molten steel bath, and the production cost is cheaper than in either of the former methods, but this method has many difficulties in that materials for the furnace have not yet been developed which are suited for supporting the molten steel at high temperatures for a long period of time, and it is difficult to exactly control the height of the molten surface and the temperature, and the cost sections of the fibers are different, or the fiber strength is the most inferior.

The present invention has been developed to remove disadvantages or faults of the conventional steel fibers for reinforcing the concrete.

It is a primary object of the invention to offer a novel method of producing steel fibers for reinforcing concrete economically.

A second object of the invention is to produce much steel fibers at a high rate of productivity.

A third object is to easily produce steel fibers which are well conditioned in catching the concrete, or which are different in shapes or sizes of cross sections.

A fourth object is to lengthen the life of a machining tool.

A fifth object is to accomplish the above mentioned four objects by means of simple facilities.

For accomplishing these objects according to the invention, a milling cutter provided with a plurality of cutting edges is positioned on the thick steel plate or block, and as the milling cutter is being rotated, a steel plate or block is moved relative thereto in the horizontal direction, and the surface of the block or plate is machined by the rotating cutting edges to extract steel fibers of approximate triangular cross section. According to the invention, a thin fragment of triangular cross section is chopped off in the form of the fiber by each of the cutting edges and at the same time it is imparted with a great shearing deformation, while the cutting edge contacts to the steel plate or block and separates therefrom. This fiber has undulations or wrinkles or irregularities on a side thereof which is not contacted to the cutting edge so that is has a large surface area and it is twisted in its axial direction due to the cutting edge which has a helix angle and its strength is made high by the work hardening caused by a large plastic deformation. Therefore, it is possible to provide as a whole steel fibers which are excellent in the strengthening characteristics to as compared those by the melt extraction method or the sheet shearing method. Machining according to the invention comprises a milling cutter, a driving means thereof and a horizontal moving means for the cutter or the steel block, thereby reducing the cost of the machinery. Further, the thick plate or block which is employed for the raw material of the steel fiber does not require a lot of processing and, accordingly the cost of the raw material is cheap. Since such material is machined into the steel fibers at a high rotating speed of the cutter, the production is speedy and the products do not need any processing for increasing the withdrawing resistance or providing undulations to widen the surface area. Therefore, it is possible to reduce the production cost 20 to 50% of the conventional cutting wire method or shearing method.

DETAILED DESCRIPTION OF THE DRAWINGS

Figure 14:
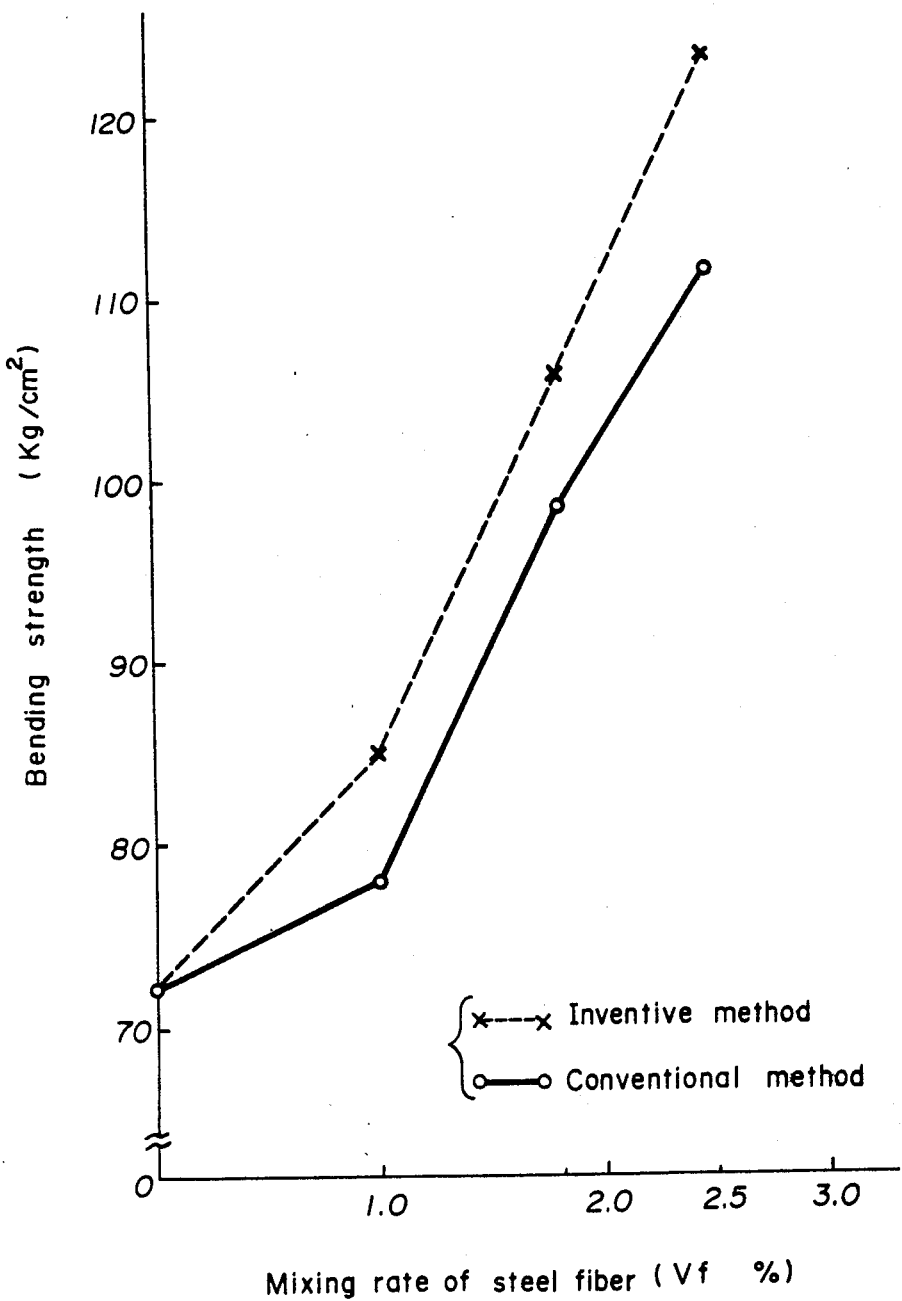

FIG. 1 is an outlined explanatory view of a conventional steel wire cutting method for production of steel fiber for reinforcing concrete, FIG. 2 is an outlined explanatory view of a thin steel sheet shearing method which is also one of the prior art techniques, FIG. 3 is an outlined explanatory view of a melt extraction method which is also one of the prior art techniques, FIG. 4 is an outlined explanatory view of a production of steel fiber by machining for reinforcing concrete according to the present invention, FIG. 5 is an outlined explanatory view showing another embodiment according to the present invention, FIG. 6 is a plan view showing an embodiment of mass production according to the present invention, FIG. 7 is a side view showing another embodiment of mass production according to the present invention, FIG. 8 is a plan view of FIG. 7, FIG. 9 is a perspective view of one example of a steel fiber obtained by the present invention, FIG. 10 shows cross sections of the steel fibers (A), (B), (C) by respectively changing a rake angle $\theta$ of the cutting edge in the present invention, FIG. 11 to FIG. 13 shows the cuttings edges (A) to be employed in the embodiments of the present invention and the steel fibers (B) obtained thereby, FIG. 14 is a graph showing a comparison of bending strength of the reinforced concrete according to the present invention and that by the conventional steel sheet shearing method, FIG. 15 is a graph showing effect of rake angle on the fiber strength, where the rake angle is changed as maintaining constant the condition of the cutting edge and the machining condition, FIG. 16 is a graph showing effect of cutting condition on the area of cross section and tensile strength of the fiber, where feed per one cutting edge and depth of cut are changed as maintaining constant the condition of the cutting edge and the machining condition, FIG. 17 is a graph showing effect of cutting condition on the area of cross section and tensile strength of the fiber, where feed per one cutting edge is changed as maintaining constant the condition of the cutting edge and the machining condition, and FIG. 18 is a graph showing effect of cutting condition on the area of cross section and tensile strength of the fiber, where the depth of cut is changed as maintaining constant the condition of the cutting edge and the machining condition.

DETAILED DESCRIPTION OF THE INVENTION

The invention will be referred to with reference to the accompanying drawings. FIG. 4 and FIG. 5 show the basic embodiments of the production of steel fiber by machining for reinforced concrete, where a reference numeral (1) is a milling cutter which is in the shape of disc or cylinder a plurality of the cutting edges provided on the circumference thereof. The milling cutter is rotated by a driving shaft (not shown). It is preferable to employ a chip of cemented carbide for the cutting edge (2) to lengthen the life of the cutting edge. A numeral (3) is a thick steel plate or block for the raw material of the steel fiber, and in view of processing, wearing of the tool and influence on the quality of the product, the steel of the low carbon content such as a mild steel or a super mild steel is suitable for the raw material. As a raw material of the high ductility is preferable, the annealed or normalized steel materials are recommended, and a free cutting steel is also acceptable in respect to elongation of the tool life. Of course, the raw material is not limited to the above listed kind of steel. Special steel such as stainless steel may product a fiber of high quality.

The milling cutter (1) is so arranged on the steel material so that the cutting edge (2) may provide a desired depth t, and as the cutter (1) is being rotated at predetermined speed, the cutter (1) and the steel material (3) are moved in succession relatively to each other in the horizontal direction, and a surface (31) of the material (3) is machined by the rotating cutting edges to extract the steel fibers (41) of approximate triangular cross section.

The machining may be carried out with one cutter (1) provided with the cutter edge (2) whose width is equal to a length of the fiber, but it is more convenient to employ the embodiments shown in FIG. 6 or FIG. 7 and 8 to increase the productivity. FIG. 6 shows that a plurality of the cutters (1) with the cutting edges (2) the width of which is almost equal to the length of the fiber, are secured in parallel on a shaft (5) with appropriate space between adjacent cutters, and under these cutters (1)(1) there are positioned the materials (3) the width of which is equal to or smaller than the width of the cutting edges (2). As the milling cutters (1)(1) are being rotated, the cutters (1)(1) and the materials (3) are moved relative to each other in the horizontal direction so that the surfaces of the materials are machined.

The embodiment in FIGS. 7 and 8 is similar to the embodiment in FIG. 6, which employs a plurality of the milling cutters (1) with the cutting edges (2) whose width is nearly equal to the fiber length, but the adjacent cutters (1)(1) are placed in contact with each other on the shaft (5), and under these cutters (1)(1) there is positioned the material (3) whose width is equal to or smaller than the sum of widths of all the cutters. As each of the cutters (1)(1) is being rotated at the same speed, the cutters (1)(1) and the block (3) are moved relative to each other in the horizontal direction to machine the surface of the block (3) as mentioned above.

Thus, it is possible to simultaneously produce many steel fibers by means of a plurality of the parallel milling cutters in the embodiments in FIG. 6 and FIGS. 7 and 8. Furthermore, in the embodiment in FIGS. 7 and 8, several steel fibers whose length are equal to the width of the cutters (1) are produced from the whole sides (in width and length) of the block (3), and therefore it is not necessary to prepare blocks of small width for each of the cutters as seen in FIG. 6. This embodiment is advantageous in view of the raw material and the relative moving means of the cutter and the material.

In the embodiments shown in FIG. 6 and FIGS. 7 and 8 it is preferable that the cutting edges are not arranged uniformly in the rotating direction on the same horizontal line, but are deviated in succession or in relation with the adjacent cutter by an appropriate pitch. Thus, in addition to increasing the productivity, the shock to the cutter on the shaft (5) may be reduced.

In the embodiments in FIG. 4 to FIG. 8, the relative movement in the horizontal direction between the cutter (1) and the block (3), is such that the cutter (1) is rotated at a determined position in relation to which the block (3) is moved horizontally, wherein the block (3) is moved in the rotation of the cutter and the reverse direction thereof as shown with arrows in FIG. 4 on one hand, and the block (3) is moved in the rotation of the cutter as shown with an arrow in FIG. 5 on the other hand. According to the former, the fibers are produced by an up-cut milling, and in the latter they are produced by a down-cut milling. From the viewpoint of wearing of the tool, the latter case will be recommended.

Another technique which can be used is that the operations in FIG. 4 and FIG. 5 may be combined and the block (3) is reciprocated with respect to the cutter (1), that is, the block is chopped by the up-cut milling and the down-cut milling in the forward and reverse directions, respectively. There is no waste in this technique, and the productivity may be increased as compared to FIG. 4 or FIG. 5 alone.

A further techniques which is not shown is that the block (3) is fixed and the cutter (1) is moved horizontally along the length of the block (3) as the cutter is being rotated. This technique is useful if the block is thick and of heavy weight.

In each of the above techniques, when one machining process from one end to the other of the block (3) is completed, the block (3) is elevated or the cutter (1) is lowered to cause the cutting edge (2) to contact to a subsequent surface (31') of the block (3). In this regard, a later mentioned depth t of the cut is controlled by the lowered amount of the cutter or the elevating amount of the block (3).

The production of the steel fiber according to the invention will be discussed in detail. The cutting edge (2) having an appropriate rake angle $\theta$ contacts the material (3) due to the rotation of the cutter (1), and then thin fragments (4') of triangular cross section are chopped from the surface (31) of the material (3) in response to the cutting depth t and a feed Sz for each cutting edge which is determined by the rotation of the cutter and the number of the cutting edges. Since a large shearing deformation which is the same as in the machining process is given to the thin fragment by the cutting of the cutting edge into the material (3), the fragment (4') is shrunk at the rake face (21) of the cutter, and finally it is thrown off in a shape of the fiber (4) with a triangular cross section.

The thus obtained steel fiber (4) is almost of the triangular cross section as shown in FIG. 9, and the length 1 is nearly equal to the width of the cutting edge (2). If the width of the material (3) is shorter than that of the cutting edge, the fiber length is equal to the width of the material (3), and if the width of the material is longer than that of the cutting edge, a convex corresponding to the cutting depth is formed by repeating the machining, with the ends of the cutting edge contacting it disadvantageously.

The steel fiber (4) is formed with an undulated or rough face (41) over the whole length at the side thereof which is not contacted with the rake face (21) of the cutting edge (2), thereby enlarging the surface area of the non-contacting side to the cutting edge and accordingly to increase the catching of the concrete. The fiber (4) is of high ductility to provide close fabrication without generating cracks, and it strength is greatly increased as compared to the raw material, because the process of hardening is effected by the shearing deformation.

The above information is the basic structure of the production of the steel fiber according to the present invention, and the shape or size of the fiber may be optionally changed within a range that the cross section is triangular by a combination of the condition of the cutting edge and the machining condition.

The invention includes a method which carries out the machining by changing one or more of parameters which are the rake angle $\theta$ of the cutting edge, the cutting depth t, the feed Sz for each cutting edge and the machining speed (the peripheral speed of the cutting edge). FIG. 10 shows variances of the cross sections of the fibers when the rake angle $\theta$ of the cutting edge (2) of the milling cutting (1) is changed. The zero rake angle produces a right-angled triangle as shown in (A), and the negative rake angle including zero produces an obtuse-angled triangle as (B), and reversely a large rake angle produces an acute-angled triangle as (C). In this regard, when the rake angle $\theta$ is zero the fiber strength is the greatest.

According to the above techniques, the shape of the cross section is all uniform in the fiber length. The invention also includes another method which carries out the machining with cutting edges (21) having concaves and convexes as shown in (A), (B), (C) of FIG. 11 to FIG. 13. Such techniques may produce the steel fibers whose cross sections have particular shapes in the length, that is, it is possible to easily produce a fiber (4a) the both ends of which are formed with steps as in FIG. 11-(B), or a fiber (4b) whose length is alternately formed with concave and convex portions as viewed in FIG. 12-(B), or a fiber (4c) which is alternately formed with V portions as in FIG. 13-(B).

In the invention, the cutting edges (2) are not made parallel to the axis of the cutter but are provided with a helix angle $\alpha$ as seen in FIG. 6 and FIG. 8 with which the machining is carried out, so that the fiber (4) is twisted in the axial direction as in FIG. 9 to increase the withdrawing resistance and accordingly to enhance the strength of the concrete and further to reduce the shock of the cutting edge (2) to the material (3). The twisting amount of the fiber may be optionally controlled by changing the helix angle $\alpha$ of the cutting edge (2).

The present invention not only changes the shape of the fiber but also changes the size of the cross section by changing the machining condition. The machining is operated by changing one or both of the cutting depth t and the feed Sz for each cutting edge, thereby to easily obtain the fibers of a small cross section (thin) or of a large cross section (thick). The larger the cutting depth t and the feed Sz for each cutting edge, the larger is the cross section, and vice versa. The invention may thus produce a steel fiber having the shape, size and strength optimum for a purpose by the combination of the machining condition and the condition of the cutting edge.

The machining may be performed when the material is at room temperature, and the invention also includes an alternative method wherein the side of the material (3) is heated by means of an appropriate heating means such as high frequency induction, plasma arc, flame or electric resistance, and the heated material (3) is machined as the material is being moved horizontally relatively with the milling cutter. The heating temperature is different due to the qualities, thickness and other characteristics of the material (3), but at a range between 200° C. and 800° C. or more than 900° C. In such a way, the tool life is elongated and the load on the cutting edge is reduced to increase the productivity.

When the heating is in the former range, the toughness of the fiber may be improved, and when it is within the latter range and if the material is a high carbon steel, an air cooling effect may be imparted to the steel fiber, and further if the material is a low carbon steel, ductility may be provided to the fiber by annealing.

Examples according to the invention will be listed, and this invention is not of course limited to them.

EXAMPLE 1

The steel fibers were produced by the method in FIG. 4.
Thick plate or block(thickness 25 mm)
  SS41 (material I)
  0.08% C super mild normalized steel (material II)
  0.08% C super mild annealed steel (material III)
Conditions of milling cutter
  diameter: 100 φ
  number of cutting edges z: 12
  rake angle θ: zero
  helix angle: 15°
  width of cutting edge: 50 mm
Machining condition
  depth t of cut: 0.5 mm
  feed Sz per one cutting edge: 0.51 mm
  machining speed V: 22.6 m/min
  number of rotation: 72 rpm
Plate or black was moved 440 mm/min by the table.

The steel fibers produced by the above conditions were 30 mm in length, right-angled in cross section and 12°/cm in twisted amount, in each of the materials I, II and III.

Table 1 shows comparisons of the cross sectional area A and the tensile strength $\sigma B$ of the steel fibers according to the invention and those by the above mentioned conventional thin sheet shearing method (2), where the thin sheet of the method(2) was the cold rolled sheet of the material III.

TABLE 1

| (a) | Area of cross section A (mm$^2$) | $\sigma B$ (kg/mm$^2$) | $\sigma B$ of plate or block (kg/mm$^2$) |
|---|---|---|---|
| (b) | | | |
| Material I | 0.25 | 71 | 43 |
| (c) Material II | 0.23 | 72 | 30 |
| Material III | 0.24 | 80 | 32 |
| (d) Material III | 0.25 | 46 | |

(a): Mechanical properties,
(b): Kinds of steel fibers
(c): Invention
(d): Conventional method(2)

EXAMPLE 2

The steel fibers were produced by the down-cut milling method in FIG. 5.
Thick plate or black (thickness 30 mm): SS41
Conditions of milling cutter
  diameter: 100φ
  number of cutting edges z: 10
  rake angle θ: zero
  helix angle α: 15°
  width of cutting edge: 30 mm
Machining condition
  depth t of cut: 0.45 mm
  feed Sz per one cutting edge: 0.8 mm
  machining speed V: 63 m/min
  number of rotation: 200 rpm
  feed of table: 1.6 m/min The steel fibers produced by the above conditions were 30 mm in length, 12°/cm in twisted amount, 0.33 mm$^2$ in cross sectional A and 71.2 kg/mm$^2$ in tensile strength $\sigma B$ The above steel fibers were mixed 0%, 1.0% and 2.5% into the concrete of 50% water and 50% concrete and of the maximum size of aggregate being 15 mm to produce the steel fiber reinforced concrete of $10 \times 10 \times 40$ cm. This product was tested by the bending strength in that the product was supported at both ends of 5 cm in length and the load was effected on its center portion. For comparison with this product, the fiber reinforced concrete by the shearing method(2) was prepared in the same conditions and the fiber of $0.5 \times 0.5 \times 30$ mm. The results are shown in FIG. 14 from which the product by the invention is excellent in the bending strength. It is apparent that the steel fiber according to the invention is high in strength, large in the surface area due to undulations and excellent in the widthdrawing resistance by the twisting thereof.

EXAMPLE 3

With regard to the material II of Example 2, the steel fiber was produced to investigate the effect of the rake angle θ of the cutter by changing the rake angle θ within $-5°$ to $+15°$ and the same conditions of the cutting edge and the machining as in Example 1. The results are shown in FIG. 15 from which it is seen that the zero rake angle produces the fiber of the maximum strength.

EXAMPLE 4

With regard to the material II of Example 1, the helix angle α of the cutting edge was changed and the rake angle was $-5°$, the conditions of the cutting edge and the machining conditions being the same as in Example 1. The results are shown in Table 2.

TABLE 2

| (e) (f) | Area of cross section A(mm$^2$) | $\sigma B$ (kg/mm$^2$) | Twist of fiber(°/cm) |
|---|---|---|---|
| 15° | 0.22 | 65 | 12 |
| 25° | 0.19 | 72 | 43 |

(e): Properties of fiber,
(f) Helix angle of cutting edge

It is seen from Table 2 that increasing of the twist angle α increases the twisted amount of the fiber, and the tensile strength, accordingly.

EXAMPLE 5

With regard to the material II of Example 1, the effects of the machining condition were investigated by changing the feed Sz for each cutting edge and/or the cutting depth t, the conditions of the cutting edge and the machining conditions being the same as in Example 1.

The mechanical properties of the steel fiber are shown in FIG. 16 where the feed Sz for each cutting edge and the cutting depth t were both changed. FIG. 17 is changing the feed Sz per one cutting edge, and FIG. 18 is of changing the cutting depth t.

It is seen from FIG. 16 to FIG. 18 that the various steel fibers different in area of the cross section and in the strength may be obtained by changing any one or both of the feed Sz for each cutting edge and the cutting depth t.

EXAMPLE 6

With regard to the material SS41 of Example 1, the steel fiber was produced by heating the surface of the steel material at about 900° C. by the oxyacetylene flame with the same conditions as in Example 1.

The obtained steel fiber was 0.24 mm² in the area of the cross section and 55 kg/mm² in the tensile strength, and was more ductile than the product processed at the room temperature in Example 1. The life of the milling cutter was elongated about 3 times.

Similarly, 18Cr-8Ni stainless steel was heated at about 300° C. and machined with the same conditions as in Example 1. The obtained stainless steel fiber was 0.24 mm² in the area of the cross section and 80 kg/mm² in the tensile strength.

I claim:

1. A reinforcing material for mixing into concrete to input high strength thereto, produced by directly cutting a surface of a steel block using a milling cutter, said material comprising a steel fiber cut from said block in a direction transverse to movement direction of said cutter and having a triangular lateral cross-section and undulations on one surface thereof, said fiber including a twist in the length thereof and shearing deformations therein wherein the strength of said fiber is increased by a plastic deformation therein, the cross-sectional area being 0.1 to 0.4 mm² and the length being 20 to 50 mm.

2. A material as set forth in claim 1 wherein said triangular cross section is a right triangle.

3. A material as set forth in claim 1 wherein said triangular cross section is an obtuse triangle.

4. A material as set forth in claim 1 wherein said triangular cross section is an acute triangle.

5. A reinforcing material for mixing into concrete to input high strength thereto, produced by directly cutting a surface of a steel block using a milling cutter, said material comprising a steel fiber cut from said block in a direction transverse to movement direction of said cutter and having a triangular lateral cross-section and undulations on one surface thereof, said fiber including a plurality of concave and convex portions of the surface thereof, and shearing deformations therein wherein the strength of said fiber is increased by a plastic deformation therein, the cross-sectional area being 0.1 to 0.4 mm² and the length being 20 to 50 mm.

6. A reinforcing material for mixing into concrete to input high strength thereto, produced by directly cutting a surface of a steel block using a milling cutter, said material comprising a steel fiber cut from said block in a direction transverse to movement direction of said cutter and having a triangular lateral cross-section and undulations on one surface thereof, said fiber including step portions at the end thereof and shearing deformations therein wherein the strength of said fiber is increased by a plastic deformation therein, the cross-sectional area being 0.1 to 0.4 mm² and the length being 20 to 50 mm.

* * * * *